US011363755B2

(12) United States Patent
Aldridge et al.

(10) Patent No.: US 11,363,755 B2
(45) Date of Patent: Jun. 21, 2022

(54) RIDING GREENSMOWER CLEAN-UP PASS SPEED CONTROL SYSTEM

(71) Applicant: DEERE & COMPANY, Moline, IL (US)

(72) Inventors: Bradley P. Aldridge, Clayton, NC (US); Ukaku A. Kalu, Raleigh, NC (US); David A. Straka, Willow Spring, NC (US)

(73) Assignee: DEERE & COMPANY, Moline, IL (US)

( * ) Notice: Subject to any disclaimer, the term of this patent is extended or adjusted under 35 U.S.C. 154(b) by 229 days.

(21) Appl. No.: 16/826,772

(22) Filed: Mar. 23, 2020

(65) Prior Publication Data
US 2021/0289694 A1  Sep. 23, 2021

(51) Int. Cl.
*A01D 34/00* (2006.01)
*A01D 34/44* (2006.01)
*A01D 101/00* (2006.01)

(52) U.S. Cl.
CPC ......... *A01D 34/006* (2013.01); *A01D 34/001* (2013.01); *A01D 34/44* (2013.01); *A01D 2101/00* (2013.01)

(58) Field of Classification Search
CPC .... A01D 34/001; A01D 34/006; A01D 34/44; A01D 34/42; A01D 34/43; A01D 34/47; A01D 34/54; A01D 34/62; A01D 34/835; A01D 2101/00
See application file for complete search history.

(56) References Cited

U.S. PATENT DOCUMENTS

| 4,866,917 | A | 9/1989 | Phillips et al. | |
| 5,394,678 | A * | 3/1995 | Lonn | G06F 11/321 |
| | | | | 56/10.2 H |
| 5,497,604 | A | 3/1996 | Lonn | |
| 5,934,051 | A | 8/1999 | Hahn | |
| 7,331,167 | B1 | 2/2008 | Drake et al. | |
| 7,610,738 | B2 * | 11/2009 | Daly | A01D 34/62 |
| | | | | 56/10.2 R |
| 8,543,295 | B2 | 9/2013 | Bryant et al. | |
| 8,544,570 | B2 | 10/2013 | Ishii et al. | |
| 9,462,746 | B1 | 10/2016 | Gerhardson et al. | |
| 9,699,961 | B2 * | 7/2017 | Ito | A01D 34/74 |

(Continued)

FOREIGN PATENT DOCUMENTS

| GB | 2578585 A * | 5/2020 | ............. A01D 34/69 |
| WO | WO2010051409 A2 | 5/2010 | |

OTHER PUBLICATIONS

Triplex Mowers Provide Enhanced Cut Quality, Jan. 22, 2019, pp. 1-2 [online], [retrieved on Jul. 19, 2021], Retrieved from the Internet <URL: https://www.deere.com/en/our-company/news-and-announcements/news releases/2019/golf/2019jan22-new-triplex-mowers/>.

(Continued)

*Primary Examiner* — Adam J Behrens

(57) ABSTRACT

A riding greensmower clean-up pass speed control system reduces the maximum ground speed if a clean-up pass control is actuated. The reduced maximum ground speed is adjustable using a display. The maximum ground speed is increased to the previous ground speed each time the plurality of grass cutting reels are raised after the clean-up pass.

9 Claims, 3 Drawing Sheets

(56) References Cited

U.S. PATENT DOCUMENTS

| | | | | |
|---|---|---|---|---|
| 2006/0021312 A1* | 2/2006 | Brandon | ................ | A01D 75/18 |
| | | | | 56/10.2 R |
| 2014/0331630 A1* | 11/2014 | Phillips | ................ | A01D 34/006 |
| | | | | 56/10.2 H |
| 2015/0351318 A1* | 12/2015 | Iyasere | .................. | A01D 34/56 |
| | | | | 56/10.2 A |
| 2020/0305341 A1* | 10/2020 | Mayefske | ............ | A01D 34/008 |
| 2021/0283765 A1* | 9/2021 | Galmarini | ............ | B25H 1/0042 |

OTHER PUBLICATIONS

Extended European Search Report and Written Opinion issued in European Patent Application No. 21156739.1, dated Jul. 28, 2021, in 17 pages.

* cited by examiner

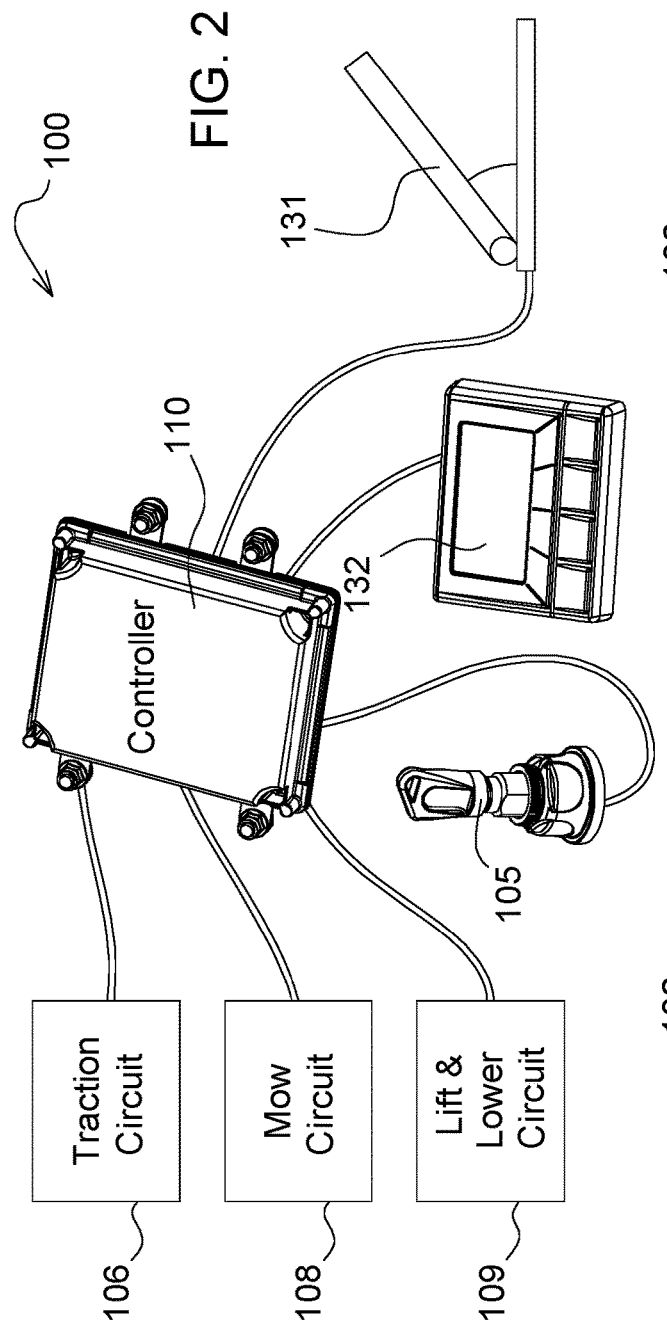
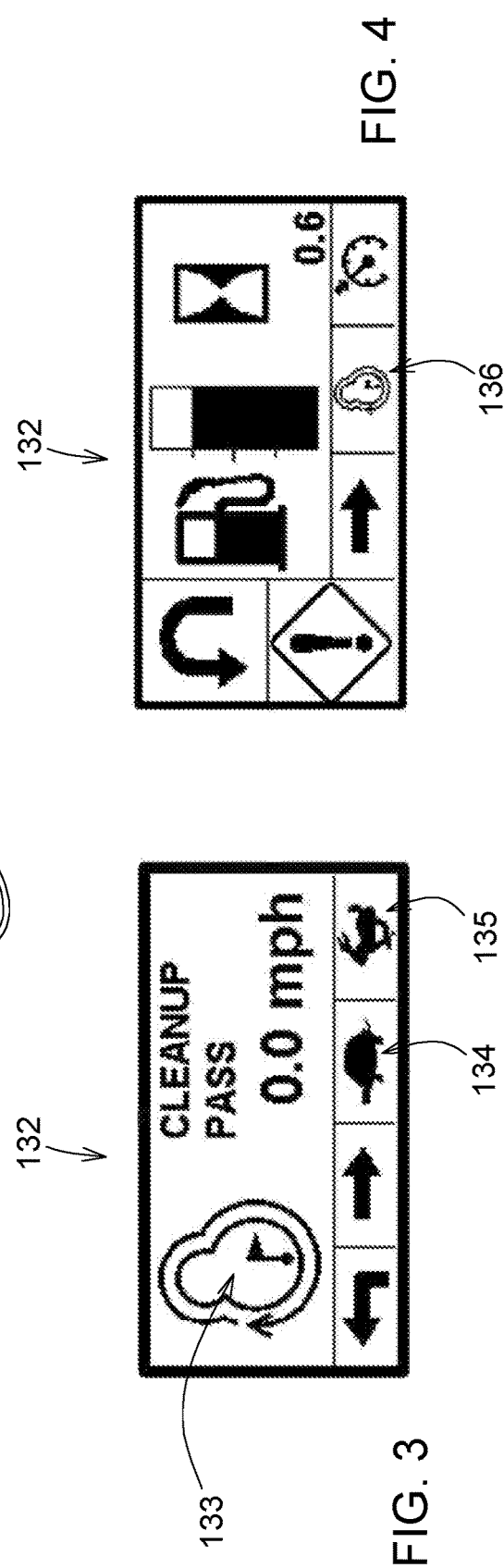
FIG. 2
FIG. 3
FIG. 4

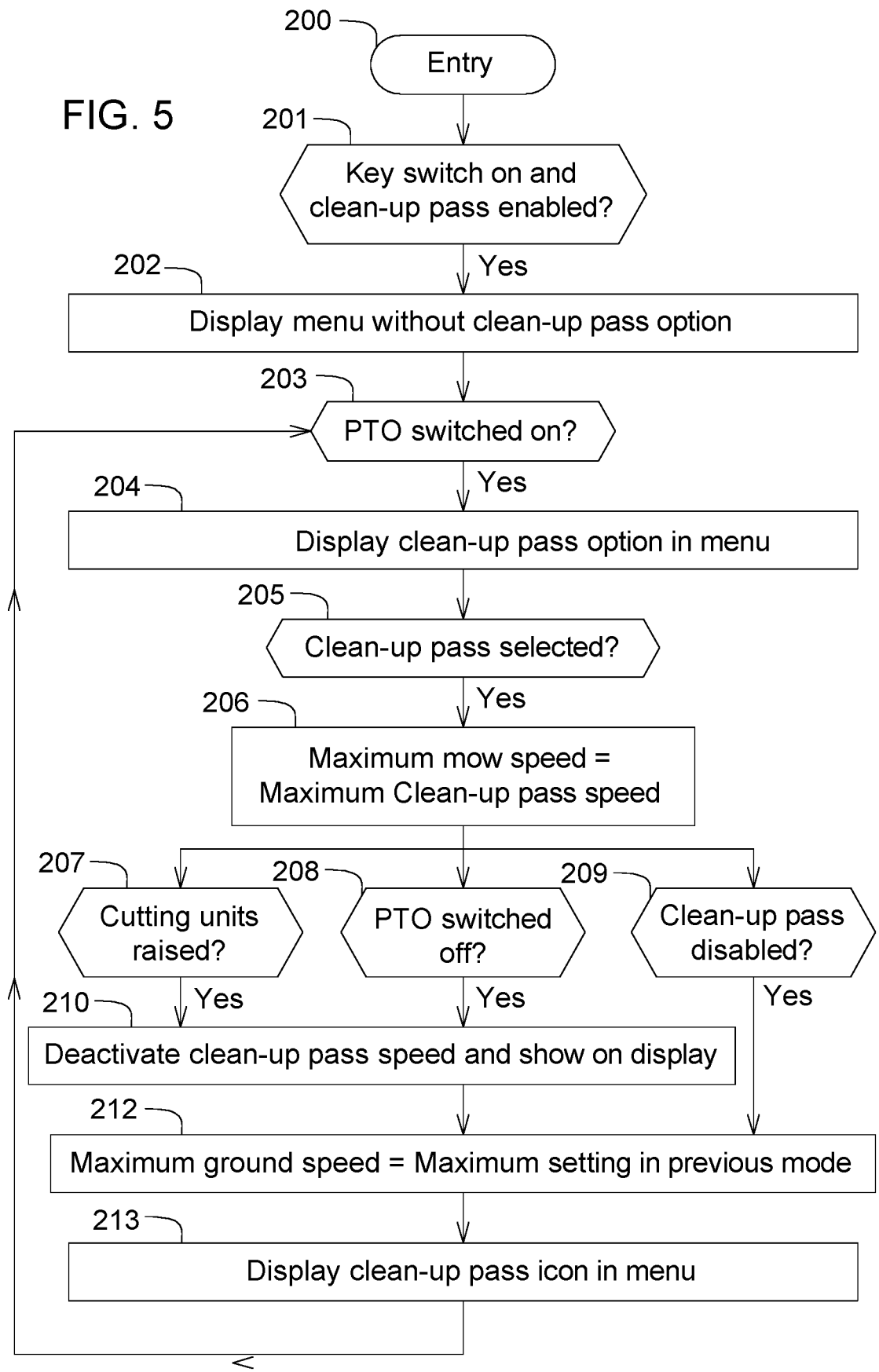

RIDING GREENSMOWER CLEAN-UP PASS SPEED CONTROL SYSTEM

FIELD OF THE INVENTION

This invention relates generally to grass mowing machines, and specifically to a riding greensmower clean-up pass speed control system.

BACKGROUND OF THE INVENTION

Mowing a golf course green involves back and forth cross cutting in straight parallel lines followed by a circumferential clean-up pass around the perimeter of the green. Triplex greensmowers, which are riding greensmowers with three cutting reels, mow at maximum speeds up to about 4 mph and can mow golf greens in less than half the time of walk behind greensmowers. To reduce ground pressure and compaction around the perimeter of the green during the clean-up pass, U.S. Pat. No. 4,866,917 for Offset Reel Arrangement for Triplex Greens Mower assigned to Deere & Company offsets the reels so that the wheels follow different tracks by alternating directions for each clean-up pass. There also is a need for a riding greensmower that can provide a more precise cut, reduce variability, and simplify operator tasks for each clean-up pass for each golf green.

SUMMARY OF THE INVENTION

A riding greensmower clean-up pass speed control system includes a controller that commands a traction circuit to reduce the ground speed to a clean-up pass traction speed upon actuation of a clean-up pass speed control such as a virtual button or switch on the display, and to increase the ground speed above the clean-up pass traction speed upon receiving a signal from the lift/lower circuit indicating the plurality of cutting units are raised.

BRIEF DESCRIPTION OF THE DRAWINGS

FIG. 2 is a block diagram of a riding greensmower clean-up pass speed control system according to one embodiment of the invention.

FIG. 3 is a front view of a display screen for changing the maximum clean-up pass speed of a riding greensmower clean-up pass speed control system according to one embodiment of the invention.

FIG. 4 is a front view of a display screen with a control for activating the clean-up pass speed of a riding greensmower clean-up pass speed control system according to one embodiment of the invention.

FIG. 5 is a software logic diagram of a riding greensmower clean-up pass speed control system according to an embodiment of the invention.

DESCRIPTION OF THE PREFERRED EMBODIMENT

Figure 1:
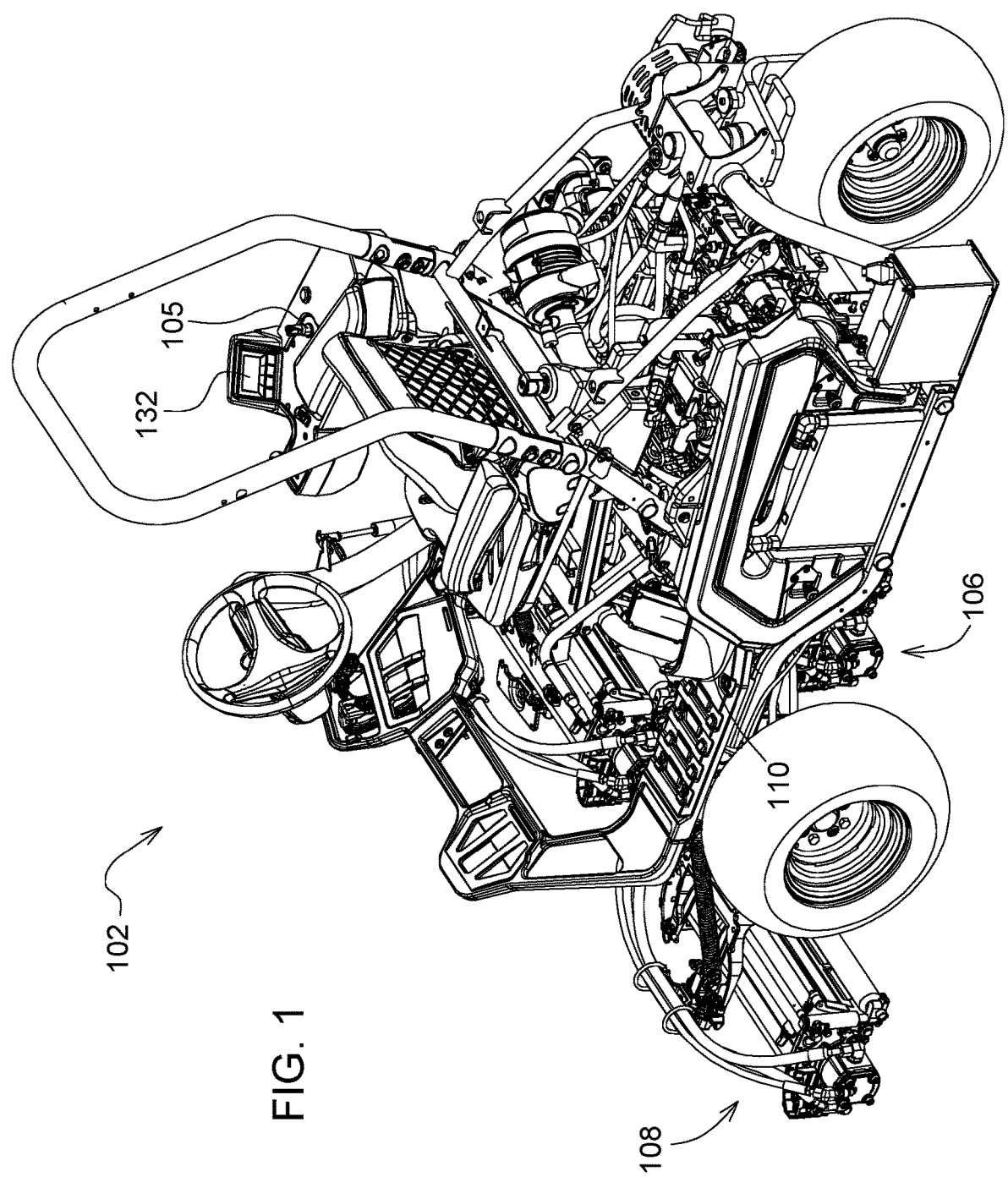
FIG. 1 is a perspective view of a riding greensmower with a clean-up pass speed control system according to one embodiment of the invention.

In one embodiment, the clean-up pass speed control system may be on riding greensmower 102 having three or more reel cutting units. The riding greensmower may be powered by an internal combustion engine, hybrid or battery powered system, and may have a hydrostatic or electric traction drive circuit 106 to propel the riding greensmower, hydraulic or electric mowing circuit 108 including a PTO switch to rotate the reel cutting units for mowing grass, and hydraulic or electric lift/lower circuit 109 to raise and lower the cutting units to the ground.

In one embodiment shown in FIG. 2, riding greensmower clean-up pass speed control system 100 may include vehicle controller 128 connected to key switch 105, hydraulic or electric traction drive circuit 106, hydraulic or electric mow circuit 108, hydraulic or electric lift and lower circuit 109, foot pedal 131, and display unit 132. The display may be used to enter a maximum clean-up pass traction or ground speed for a pedal position of 100%. The vehicle controller may store the maximum clean-up pass speed, which may be a reduced traction or ground speed that is less than or equal to the maximum desired ground speed in one or more mow modes. For example, the maximum clean-up pass speed may be a traction or ground speed of 1.5 mph at 100% pedal position, while the maximum traction or ground speed in one or more other mow modes may be a higher speed such as 4 mph at 100% pedal position.

In one embodiment shown in FIG. 3, the riding greensmower clean-up pass speed control system may include display unit 132 which may include clean-up pass icon 133 along with increase and decrease buttons 134, 135. However, access to adjust the clean-up pass speed may be passcode protected by the controller so that only authorized personnel, rather than riding greensmower operators, can change the maximum clean-up pass speed. For example, a golf course supervisor may use the increase and decrease buttons to incrementally change the maximum clean-up pass ground or traction speed that may be saved in the vehicle controller's memory.

In one embodiment shown in FIG. 4, display unit 132 for the riding greensmower clean-up pass speed control system may have a menu that includes clean-up pass icon 136. The clean-up pass icon may serve as a control such as a virtual button or switch that an operator may use to change from the maximum mowing speed to the reduced clean-up pass speed while the PTO switch is on and the mow circuit is operating. Mowing at the clean-up pass speed helps provide a more precise cut, reduces variability, and simplifies operator tasks.

In one embodiment shown in FIG. 5, riding greensmower clean-up pass speed control system 100 may include control logic which vehicle controller 128 may enter in block 200. The controller may determine if key switch 105 is on and the clean-up pass system is enabled in block 201. In block 202, the display may not show the clean-up pass option until the PTO is switched on in block 203 to run the mow circuit. Once the operator turns on the PTO switch to run the mow circuit, the display menu may show the clean-up pass option as an icon in block 204. Each time the operator touches the clean-up pass icon in block 205, it serves as a control such as a virtual button or switch to notify the vehicle controller to reduce the maximum mow speed in block 206 to the maximum clean-up pass speed which was stored previously in the vehicle controller memory. When the operator selects the reduced clean-up pass speed, the vehicle controller may command the hydraulic or electric traction circuit 106 to run at the maximum clean-up pass traction or ground speed for 100% pedal position, and the hydraulic or electric mow circuit 108 to rotate the cutting reels at the clean-up pass reel speed matching the desired traction speed to provide the specified frequency of clip stored in memory. As a result, the clean-up pass speed control system assures a consistent reduced speed for more precise clean-up passes, especially with the pedal at the 100% position. The clean-up pass speed control system also allows the operator to use pedal positions below 100% to reduce speed further during each clean-up pass. The vehicle controller may command the traction circuit and mow circuit to run at speeds below the maximum clean-up pass speed when the pedal position is below 100%.

In one embodiment, riding greensmower clean-up pass speed control system 100 may include a controller that deactivates the clean-up pass ground speed and clean-up pass reel speed automatically each time the controller receives a signal from the lift and lower circuit indicating the lift lever or switch was actuated in block 207 to raise the cutting units. Additionally, the controller may deactivate the clean-up pass ground speed and clean-up pass reel speed if it receives a signal from the mow circuit indicating the operator turned off the PTO switch in block 208. In either case, the present invention simplifies operator tasks by automatically reverting to the prior ground speed and reel speed for the next green. The controller may deactivate the clean-up pass speed and cause the display to show the deactivated clean-up pass icon in block 210. Alternatively, the clean-up pass system may be disabled in block 209 if the operator presses the clean-up pass control such as a virtual button or switch on the display. When the controller deactivates the clean-up pass speed, the controller may command the traction drive system in block 212 to return to the maximum ground speed from the previous mode setting, and the mow circuit to return to the maximum reel speed from that setting. The controller then may show the clean-up pass icon on the display menu again in block 214. The operator may actuate the clean-up pass speed control system when he or she is ready to perform the clean-up pass on the next green, using a control such as the virtual button or switch on the display.

In one embodiment, the riding greensmower clean-up pass speed control system also may be used with a riding greensmower having cruise control setting by disabling cruise control automatically when the operator activates the clean-up pass system using a control such as the virtual button or switch on the display.

Having described a preferred embodiment, it will become apparent that various modifications can be made without departing from the scope of the invention as defined in the accompanying claims.

The invention claimed is:

1. A riding greensmower clean-up pass speed control system, comprising:
  a riding greensmower having a traction circuit propelling the riding greensmower at a variable ground speed up to a maximum ground speed while mowing, and having a lift/lower circuit to raise and lower a plurality of cutting units; and a mow circuit to rotate a cutting reel in each of the plurality of cutting units at a variable reel speed up to a maximum reel speed; and
  a controller commanding the traction circuit to reduce the maximum ground speed to a maximum clean-up pass ground speed and the mow circuit to reduce the maximum reel speed to a maximum clean-up pass reel speed upon actuation of a clean-up pass control, and commanding the traction circuit to increase the maximum ground speed above the maximum clean-up pass ground speed and the mow circuit to increase the maximum reel speed above the maximum clean-up pass reel speed upon receiving a signal from the lift/lower circuit indicating the plurality of cutting units are raised.

2. The riding greensmower clean-up pass speed control system of claim 1 further comprising a display on the riding greensmower that is adjustable to change the maximum clean-up pass ground speed.

3. The riding greensmower clean-up pass speed control system of claim 1 wherein the maximum clean-up pass ground speed is for a pedal position of 100%.

4. A riding greensmower clean-up pass speed control system, comprising:
  a riding greensmower having a clean-up pass speed control that reduces a maximum ground speed to a maximum clean-up pass ground speed and reduces a maximum reel speed to a maximum clean-up pass reel speed while mowing with a plurality of cutting reels;
  a lift/lower switch that raises the plurality of cutting reels and increases the maximum clean-up pass ground speed to the maximum ground speed and increases the maximum clean-up pass reel speed to the maximum reel speed.

5. The riding greensmower clean-up pass speed control system of claim 4 wherein the maximum ground speed and the maximum clean-up pass ground speed are each for a pedal position of 100%.

6. The riding greensmower clean-up pass speed control system of claim 4 further comprising an adjustable display for setting the maximum clean-up pass ground speed and the maximum clean-up pass reel speed.

7. The riding greensmower clean-up pass speed control system of claim 4 wherein the clean-up pass control reduces the maximum ground speed to a maximum clean-up pass ground speed only when a PTO switch is actuated to rotate the cutting reels.

8. A riding greensmower clean-up pass speed control system, comprising:
  a plurality of grass cutting reels on a riding greensmower with a traction drive circuit that propels the riding greensmower while mowing at up to a maximum ground speed, and propels the riding greensmower while mowing at up to a reduced maximum ground speed if a clean-up pass control is actuated on a display; the reduced maximum ground speed being adjustable using the display;
  the traction drive circuit increasing the maximum ground speed from the reduced maximum ground speed each time the plurality of grass cutting reels are raised; and
  a mowing circuit changing a maximum rotational speed of the plurality of grass cutting reels from a reduced maximum cutting reel speed to a maximum cutting reel speed each time the plurality of grass cutting reels are raised.

9. The riding greensmower clean-up pass speed control system of claim 8 wherein the maximum ground speed and the reduced maximum ground speed are each for pedal position of 100%.

* * * * *